United States Patent [19]
Pedersen et al.

[11] Patent Number: 5,873,384
[45] Date of Patent: *Feb. 23, 1999

[54] PRESSURE RELIEF VALVE FOR PRESSURE EQUALIZATION BETWEEN A CLOSED SPACE AND THE SURROUNDING ATMOSPHERE

[75] Inventors: Hans-Henrik Raagaard Pedersen; Anders Ib Damborg Petersen, both of Lynge, Denmark

[73] Assignee: Emil Aarestrup Sørensen, London, Great Britain

[ * ] Notice: This patent issued on a continued prosecution application filed under 37 CFR 1.53(d), and is subject to the twenty year patent term provisions of 35 U.S.C. 154(a)(2).

[21] Appl. No.: 765,641
[22] PCT Filed: May 31, 1995
[86] PCT No.: PCT/DK95/00212
  § 371 Date: Dec. 30, 1996
  § 102(e) Date: Dec. 30, 1996
[87] PCT Pub. No.: WO96/01962
  PCT Pub. Date: Jan. 25, 1996

[30] Foreign Application Priority Data

Jul. 8, 1994 [DK] Denmark .................................... 817/94

[51] Int. Cl.$^6$ ..................................................... F16K 17/12
[52] U.S. Cl. ................. 137/471; 137/493.8; 137/533.21; 137/534
[58] Field of Search ................................. 137/471, 493.8, 137/533.21, 534

[56] References Cited

U.S. PATENT DOCUMENTS 253,622  2/1882  Pearson .................................... 137/471
5,060,688  10/1991  Sorensen .................................. 137/471

FOREIGN PATENT DOCUMENTS 63490  8/1892  Germany ................................. 137/471

*Primary Examiner*—Gerald A. Michalsky
*Attorney, Agent, or Firm*—Watson Cole Grindle Watson, P.L.L.C

[57] ABSTRACT

A pressure relief valve includes a valve housing and a drop-shaped body with a conical valve surface that cooperates with a conical valve seat at an upwardly directed blow-off opening of the valve housing. The drop-shaped body is connected to a lifting disc in the housing. The inner configuration of the housing provides an annular passage around the lifting disc which is smaller in area when the lifting disc (and drop-shaped body) is in its uppermost, fully open positioning as compared to its lowermost, closed positioning.

1 Claim, 3 Drawing Sheets

5,873,384

PRESSURE RELIEF VALVE FOR PRESSURE EQUALIZATION BETWEEN A CLOSED SPACE AND THE SURROUNDING ATMOSPHERE

BACKGROUND OF THE INVENTION

1. Field of the Invention

The invention relates to a pressure relief valve for pressure equalization between a closed space and the surrounding atmosphere, and particularly to such pressure relief valves used in tankers for oil products and chemicals. In and in the following explanation and description this field of use will be taken as point of departure, but it will be understood that the same principles will be equally applicable to other fields of use, e.g., for stationary storage tanks or for rolling transportation tanks for liquid petroleum products or chemicals.

2. Prior Art

When a certain volumetric quantity of product per time unit, e.g., measured in $m^3/h$, is loaded into a tank, the associated pressure relief valve is to be opened when the pressure in the tank has risen above a pre-set closing pressure, and thereafter a quantity of gas is to be blown off per time unit corresponding to the quantity of product loaded per time unit with an addition, where applicable, for evaporation from the liquid surface in the tank. The blow-off quantity per time unit depends on the flow resistance of the valve—and thereby on the lifting height of the valve—and on the pressure in the tank. The maximum blow-off quantity per time unit—with deduction of any addition for evaporation—which is obtainable without the pressure in the tank exceeding a certain safety limit is referred to as the capacity of the pressure relief valve, which is thus a measure of the maximum permissible loading quantity per time unit (e.g. $m^3/h$).

The volumetric quantity of product loaded per time unit is referred to as the loading rate (e.g. $m^3/h$), and the volumetric quantity of gas blown off per time unit as the blow-off rate (likewise e.g. $m^3/h$). The latter is not to be confused with the blow-off velocity, which means the linear velocity at which the gas is blown off through the valve opening, e.g., measured in m/sec..

More particularly, the invention relates to a pressure relief valve which includes a valve housing provided at its top with a blow-off opening formed with an upwardly-facing, substantially conical valve seat, a drop-shaped body suitable for concentrating a flow of gas impinging on its underside to an upwardly-directed jet, a substantially conical valve face for closing against the valve seat being formed on the downwardly-facing portion of the rounded surface of the drop-shaped body, which thereby constitutes a valve body, and a lifting disc connected with the drop-shaped body and located at a lower level within the housing, the lifting disc having an outer diameter greater than the inner diameter of the valve seat, stop means for defining a fully open position of the valve, the lifting disc being surrounded by a free passage slot in the closed position of the valve.

Such a pressure relief valve is disclosed and claimed in international patent application PCT/DK90/00050, published on 07.09.90 under No. WO 90/10168.

Due to the arrangement described, the lifting pressure is shifted at the initiation of the opening from the smaller area of the underside of the drop-shaped member within the valve seat to the larger area of the lifting disc, whereby a higher lifting speed is obtained.

In the embodiment disclosed in WO 90/10168, the valve housing has an inner configuration such that the free passage area around the lifting disc is increased when the drop-shaped body and the lifting disc are lifted, whereby also at increasing blow-off quantity, a lower pressure is obtained than would otherwise be possible, until the valve approaches its fully open condition.

It has been found, however, that in some circumstances, depending, i.e., on the type of product to be loaded and the facilities and practices of the loading station, situations may occur, particularly at relatively low rates of loading and correspondingly low flow-off rates from the tank being loaded, where the flow-control element consisting of the drop-shaped valve body and the lifting disc will be subjected to fluctuations of the rate of gas flow caused, e.g., by turbulence or non-uniform distribution of the flow. The resulting vibratory movement of the flow-control element will act back on the rate of flow, and thereby a reciprocal-amplifying effect may be initiated which may cause the valve to vacillate forth and back between the fully open and the closed position. Thereby the valve may be subjected to a rapid succession of heavy clashes of metal against metal, which is in itself undesirable for mechanical reasons, and besides may produce a loud noise, which may even be amplified by the tank wall as a reverberator.

SUMMARY OF THE INVENTION

It is the object of the invention to remedy or reduce this drawback, and according to the invention this is achieved by providing the valve housing with an inner configuration such that the free passage area around the lifting disc is decreased when the drop-shaped body and the lifting disc are lifted from the closed to the fully open position.

By this arrangement the high speed of opening of the valve upon reaching the opening pressure is maintained, but once the valve has been opened, the blow-off pressure acting on the blow-off control element will over a wide range be much less dependent on the blow-off rate and therefore less sensitive to fluctuations of the rate of gas flow, so that vacillation of the valve forth and back between the fully open and the closed position may be avoided or at least will be softened and slowed down.

BRIEF DESCRIPTION OF THE DRAWINGS

The invention will now be described in more detail with reference to the accompanying drawings, in which.

DETAILED DESCRIPTION OF THE PREFERRED EMBODIMENT

Figure 1:
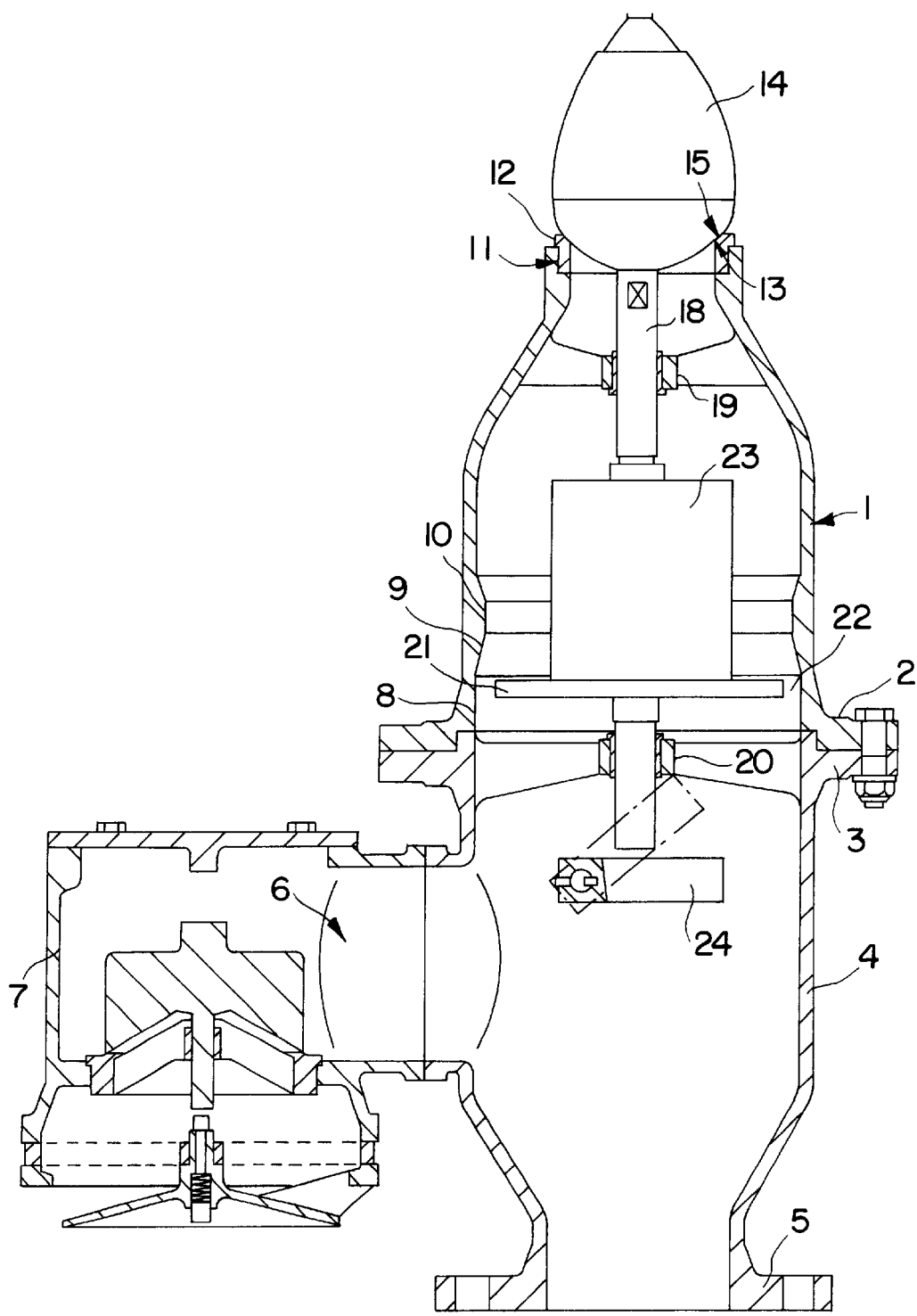
FIG. 1 shows a side view, partially sectioned, of a pressure relief valve according to a preferred embodiment of the invention, the valve being illustrated in its closed position.
Figure 2:
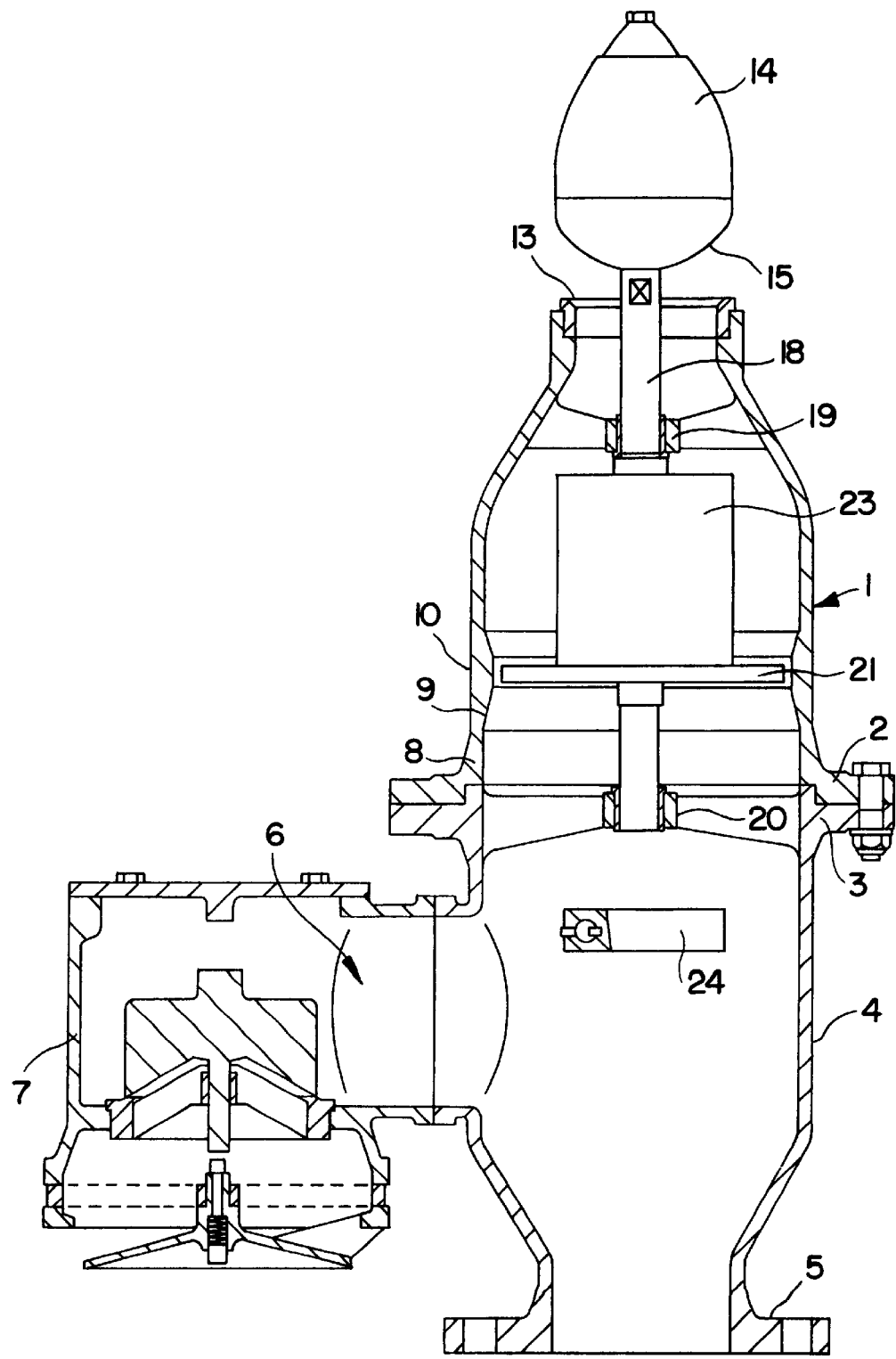
FIG. 2 is a corresponding illustration of the valve in its fully open position and, FIGS. 3 and 4 are graphs representing the tank pressure and the blow-off velocity, respectively, as plotted against the volumetric blow-off quantity per time unit, as determined for a prototype of a pressure relief valve constructed in accordance with the invention.

In the drawings, 1 is a vertically oriented valve housing, which at its lower end has a flange 2 which is bolted to a flange 3 of a tubular socket 4 constructed at its lower end with a flange 5 that can be bolted to a pressure relief outlet of an oil tank or to the upper end of a pressure relief pipe connected to one or more tank compartments. In the embodiment shown, the socket 4 has a lateral opening 6 to which a vacuum relief valve 7 is connected. This valve will not be described in detail, because it does not form part of the invention.

At its lower end the valve housing has a cylindrical wall portion 8 which in an upward direction is followed by a converging wall portion 9 and thereafter a cylindrical wall portion 10. At its top the valve housing is terminated by a blow-off opening 11.

In the blow-off opening there is mounted a mouth ring 12 at the inner side of which a conical valve seat 13 is formed. In the blow-off opening 11 there is arranged a drop-shaped body 14 on the underside of which a conical valve surface 15 is formed which in the closed condition of the valve sealingly engages the valve seat 13. For improving the tightness, an annular elastic gasket may be arranged on the inner side of the mouth ring for engaging the underside of the drop-shaped body 14, as disclosed in WO 90/10168.

A stem 18 is connected to the drop-shaped body and extends down through the housing where it is guided by an upper stem guide 19 in the valve housing and a lower stem guide 20 in the socket 4. The stem 18 carries a lifting disc 21 which in the closed position of the valve is located in the interior of the cylindrical wall portion 8 and has a slightly smaller diameter than the latter so that a free passage slot 22 is formed around the lifting disc. Under the lower end of the stem 18 there is mounted a rocking lever 24 for use in check-lift of the valve.

The stem 18 carries a weighting load 23 between the upper stem guide 19 and the lifting disc 21. Thus, the structure, referred to herein as the flow-off controlling member, including the drop-shaped body 14, the stem 18, the weighting load 23, and the lifting disc 21, is subjected to a downwardly directed closing force equal to the total weight of all parts of the structure. The weighting load 23 may be supplemented or replaced by a compressional spring, as disclosed in WO 90/10168.

If a pressure in excess of that of the atmosphere comes up in the tank, then, owing to the leakage through the slot 22, this pressure will propagate to the space above the lifting disc 21, and this will therefore be subjected to the same pressure from above and from below. A lifting force is therefore produced solely by the action of the excess pressure on the underside of the drop-shaped body. This lifting force is equal to the excess pressure multiplied by the cross-sectional area of the blow-off opening inside the valve seat.

When the lifting force rises above the previously mentioned closing force, the valve is opened. When the blow-off commences at the opening of the valve, the pressure on the upper side of the lifting disc drops, and the net value of the lifting force becomes equal to the tank pressure multiplied by the area of the lifting disc. Since this is larger than the area of the blow-off opening, the lifting force is augmented, and thereby the lifting speed is increased.

When the lifting disc is thus lifted, the passage area around the disc, which controls the flow resistance of the valve, will decrease owing to the convergency of the wall portion 9.

Figure 3:
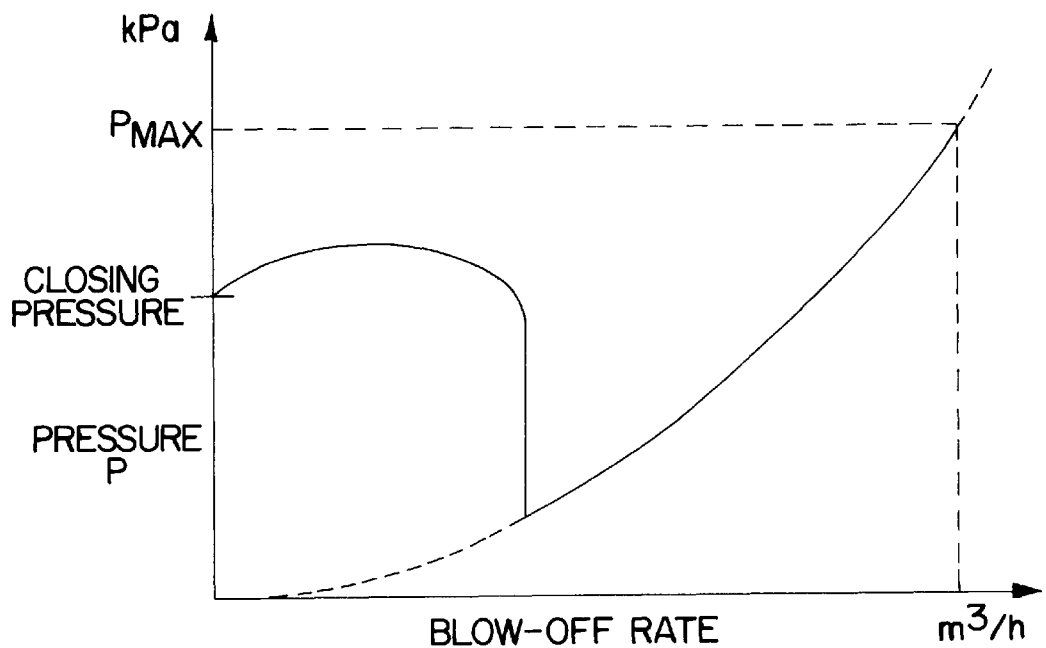

Since the passage area around the lifting disc determines the flow resistance of the valve, and thereby the pressure drop across the valve for a given blow-off rate, a definite relationship will exist between the tank pressure and the blow-off rate, as illustrated in FIG. 3, the tank pressure being equal to the atmospheric pressure plus the pressure drop across the valve, which is practically the same as the pressure drop in the passage area around the lifting disc.

Figure 4:
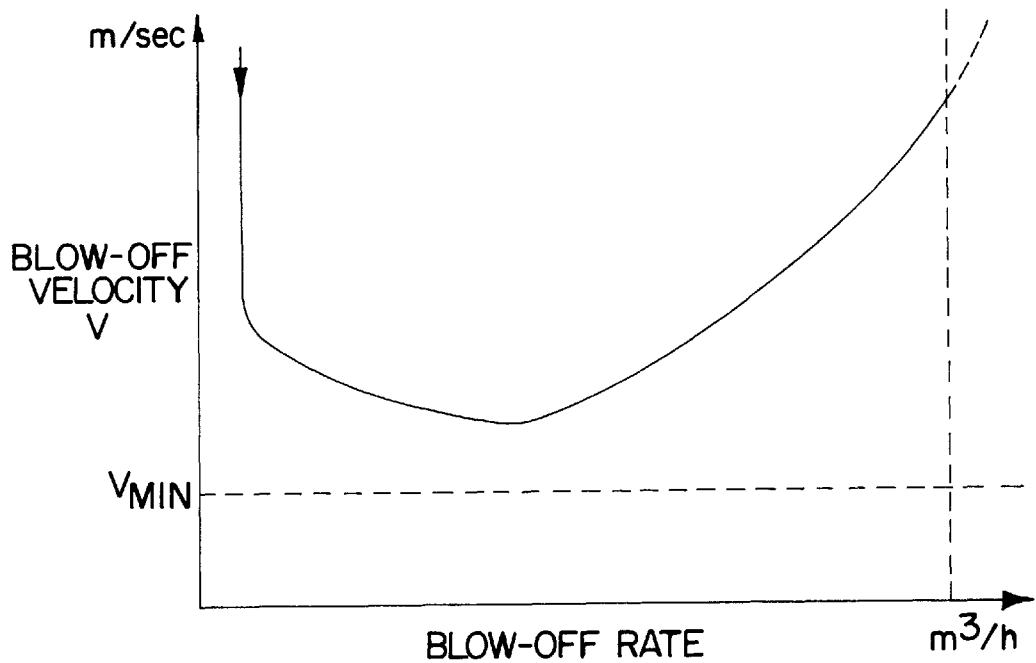

The velocity of the blow-off gas is determined by the blow-off rate and the passage area around the lifting disc and can therefore also be determined, as illustrated in FIG. 4.

FIG. 3 illustrates that at blow-off rates varying from zero up to a certain boundary value, the pressure varies along a flat curve first upwards and then back to the closing pressure value. When the boundary value is exceeded, the pressure drops abruptly to the same value as it would have had if the valve had been fully open from the start, as indicated by the dotted graph portion. At continued increase of the blow-off rate the valve remains fully open, and the tank pressure increases further, and when it assumes the value $P_{max}$, the blow-off rate has reached the maximum permissible value, which is referred to as the capacity of the pressure relief valve. If, during loading of the tank, the loading rate, with deduction for evaporation, if any, is kept below the capacity of the pressure relief valve, the tank is, within a substantial safety margin, protected against explosion.

The noted boundary value of the blow-off rate subdivides the available range of blow-off rates into a lower range in which the influence of the blow-off rate on the tank pressure and thereby on the lifting force acting on the valve is very small, and an upper range in which the pressure relief valve is constantly in its fully open position.

In either range the risk of vacillation of the valve forth and back between the fully open and the closed position as a consequence of accidental fluctuations of the rate of gas flow will be practically eliminated.

As illustrated in FIG. 4, the blow-off velocity of gas through the valve will be so high at very low blow-off rates that it is beyond illustration. At increasing blow-off rates it decreases to a minimum value at or about the boundary value of the blow-off rate. The dimensioning should be such that this minimum value is well above the minimum value $V_{min}$ prescribed for high velocity valves, e.g. 30 m/sec.

We claim:

1. A pressure relief valve for pressure equalization between a closed space and the surrounding atmosphere, comprising a valve housing provided at its top with a blow-off opening formed with an upwardly facing substantially conical valve seat, a drop-shaped body suitable for concentrating a flow of gas impinging on its underside to an upwardly directed jet, a substantially conical valve face for closing against said valve seat being formed on the downwardly facing portion of the rounded surface of said drop-shaped body, which thereby constitutes a valve body, and a lifting disc connected with said drop-shaped body and located at a lower level within the housing, said lifting disc having an outer diameter greater than the inner diameter of said valve seat, and stop means for defining a fully open position of the valve, the lifting disc being surrounded by a free passage slot in the fully closed position of the valve, said valve housing having an inner configuration such that the free passage area around the lifting disc is decreased when the drop-shaped body and the lifting disc are lifted from the fully closed to the fully open position.

* * * * *